(12) United States Patent
Alsaid

(10) Patent No.: US 11,926,112 B1
(45) Date of Patent: Mar. 12, 2024

(54) TATTOO ARTIST PRACTICE TOOL SYSTEM, METHOD AND ARTICLE

(71) Applicant: Shahad Monthir Alsaid, Dearborn, MI (US)

(72) Inventor: Shahad Monthir Alsaid, Dearborn, MI (US)

(73) Assignee: Shay Alsaid LLC, Dearborn, MI (US)

( * ) Notice: Subject to any disclaimer, the term of this patent is extended or adjusted under 35 U.S.C. 154(b) by 0 days.

(21) Appl. No.: 18/051,577

(22) Filed: Nov. 1, 2022

(51) Int. Cl.
| | |
|---|---|
| *B29C 43/24* | (2006.01) |
| *B29C 71/04* | (2006.01) |
| *B41M 5/26* | (2006.01) |
| *B29C 35/08* | (2006.01) |
| *B29K 83/00* | (2006.01) |
| *B29K 105/00* | (2006.01) |
| *G09B 23/30* | (2006.01) |

(52) U.S. Cl.
CPC .............. *B29C 71/04* (2013.01); *B41M 5/267* (2013.01); *B29C 2035/0838* (2013.01); *B29K 2083/00* (2013.01); *B29K 2105/0032* (2013.01); *B29K 2995/002* (2013.01); *G09B 23/30* (2013.01)

(58) Field of Classification Search
CPC .... A61M 37/0076; B29C 43/24; B29C 43/40; B29C 69/001; B29C 2791/009; B29C 2035/0838; B29K 2083/00; B29K 2105/0032; B29K 2995/002; B41M 5/267; G09B 23/30
USPC ... 264/73, 76, 157, 160, 328.1, 331.11, 400, 264/482
See application file for complete search history.

(56) References Cited

U.S. PATENT DOCUMENTS

| | | |
|---|---|---|
| 5,435,240 A | 7/1995 | Fromm |
| 5,543,191 A | 8/1996 | Dronzek, Jr. et al. |
| 6,095,049 A | 8/2000 | Lewis et al. |
| 6,106,852 A | 8/2000 | Vineberg |
| 6,109,921 A | 8/2000 | Yau |
| 7,131,446 B2 | 11/2006 | Tang et al. |
| 8,545,613 B2 | 10/2013 | Blette |
| 10,414,205 B2 | 9/2019 | Arie |
| 10,556,402 B1 | 2/2020 | Huff et al. |
| 11,220,114 B2 | 1/2022 | Lee et al. |
| 2002/0136969 A1* | 9/2002 | Hiller ................. B41C 1/05 430/945 |
| 2006/0249173 A1 | 11/2006 | Lawson |
| 2013/0323477 A1 | 12/2013 | Depauw et al. |
| 2014/0308651 A1 | 10/2014 | McClurg, Jr. |
| 2020/0327826 A1 | 10/2020 | Weir et al. |
| 2021/0090457 A1 | 3/2021 | Deegan |
| 2022/0055360 A1 | 2/2022 | Drammeh Mora et al. |

FOREIGN PATENT DOCUMENTS

| | | | | |
|---|---|---|---|---|
| DE | 202011107796 U1 * | 1/2012 | ............ | B41M 5/267 |
| GB | 2529413 A * | 2/2016 | ........ | A61M 37/0076 |
| WO | WO-2011117722 A1 * | 9/2011 | ............. | G09B 23/30 |

OTHER PUBLICATIONS

Translation of DE-202011107796-U1 (published on Jan. 26, 2012).*
Translation of WO-2011117722-A1 (published on Sep. 29, 2011).*

* cited by examiner

*Primary Examiner* — Leo B Tentoni
(74) *Attorney, Agent, or Firm* — Dunlap Bennett & Ludwig, PLLC

(57) ABSTRACT

A tattoo arts practice pad is made by forming an otherwise-blank silicone pad having distributed pigment from a color dye, then lasering imagery onto the pad to result in traceable line images corresponding to areas that discolor the ink, so that discoloration in the shape of the line image on the pigment results without covering silicone with another material and without altering smoothness or silicone-tattoo needle interactions.

5 Claims, 1 Drawing Sheet

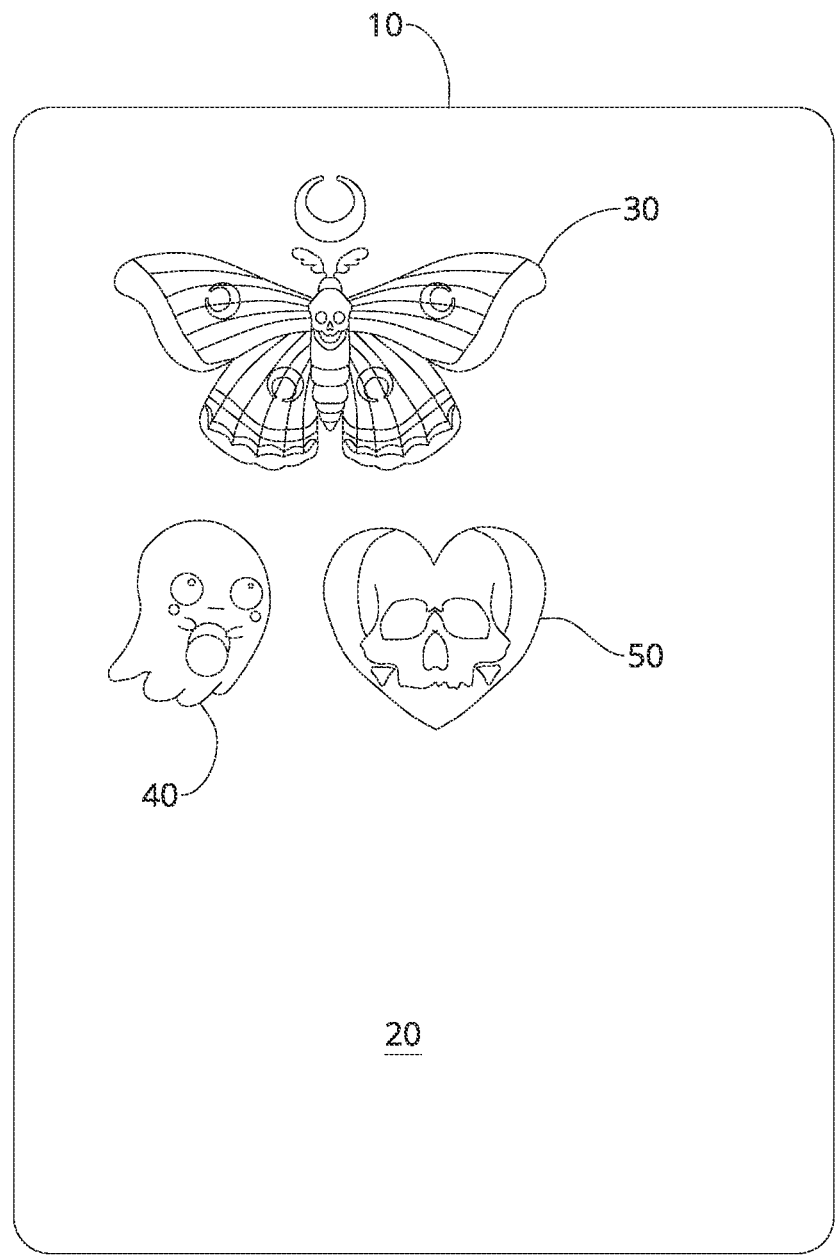

TATTOO ARTIST PRACTICE TOOL SYSTEM, METHOD AND ARTICLE

FIELD OF THE INVENTION

The present invention relates to fields of educational and practice materials for tattoo artists.

BACKGROUND OF THE INVENTION

Body art has a long tradition in human history. The 5,300 year old preserved mummy of Otzi the Iceman has 61 tattoos. Body art remains popular today.

While normally there is no licensure requirement for would-be tattoo artists (facilities instead need licenses), tattoo artists need training and education. A typical educational program can cost thousands of dollars. Apprenticeships are also a common way to enter the field. Both schools and shops with apprentices need practice tools.

Plain silicone pads (such as those available from electrumsupply.com) are excellent practice tools. The action of the ink-delivering needle on silicone (texture, delivery rate, diffusion) mimics well the action of the needle on skin. It is commonplace for students and apprentices to practice using plain silicone pads, making lines and brush strokes with a real ink delivery needle to prepare for live clients. Silicone tattoo practice pads in the form of full three-dimensional forms, in different skin tones, are also known. One example is in U.S. Published App. No. 2020/0327826.

These prior technologies and teaching aids have the disadvantage that they do not permit practice of specific tattoo imagery, through tracing and mimicry. That is, default line or brush imagery is completely absent on prior art silicone practice pads. This problem is not solved through conventional printing technologies, as heretofore conceived. Conventional printing on silicone is known to be difficult to impossible, as only specialized silicone-based inks or vinyl properly adhere to a silicone surface.

Other attempts to put design imagery onto practice skins have had limited success. Latex is more receptive to ink, but latex practice skins do not have the same action and texture as silicone, and are inferior as a practice surface. Vinyl printing onto silicone results in relatively hard coatings at the printed line, reducing the practice experience to filling in unprinted regions. What is needed is a silicone practice skin allowing full needle penetration, even on design line surfaces.

SUMMARY OF THE INVENTION

The present invention solves the foregoing drawbacks in the prior art with a new system and method for creating tattoo art practice pads, along with the novel pads themselves, whereby such pads include suitable areas for students to trace and brush with needles. In one aspect, the invention comprises the steps of forming a dye-colored silicone pad, then lasering at least one line image onto the pad such that discoloration in the shape of the desired image results. In another aspect, multiple such images are lasered onto a single pad. In another aspect, the discoloration lightens the area compared to the dye pigment. In another aspect, the discoloration darkens the area compared to the dye pigment. In another aspect, the dye-colored pad can comprise tones corresponding to common ethnicity skin tones, such as African-American, Asian, LatinX and Caucasian shades.

Further objects of the invention will be apparent from the following detailed description.

BRIEF DESCRIPTION OF THE DRAWINGS

The sole FIGURE is a plan view of an exemplary practice pad of the present invention, and made using the system and method of the present invention.

DETAILED DESCRIPTION OF THE PREFERRED EMBODIMENT

The following detailed description is exemplary and not intended to be limiting. The scope of the present invention is defined by each of the respective claims that follow.

In the system and method of the present invention, a computer system (not shown) will contain a plurality of tattoo-appropriate practice illustrations. Such illustrations may be stored conventionally as files that can be manipulated in applications such as ADOBE ILLUSTRATOR, MICROSOFT WORD or (preferably) PROCREATE. Using such an application, an operator will establish a pad design page on a computer screen. Such page will comprise a layout of one or more illustrations, arranged as desired to be "printed" on a silicone practice pad. It will be noted that the pad design page is completely customizable, from one pad design to another.

Before "printing" of the pad design occurs, silicone pads are created. During silicone pad manufacturing, raw material in the form of a silicone gum is fed a preselected amount of dye so that dye pigment distributes evenly through the gum. A roller process works or kneads the dye in, and this process is repeated sufficient times so that pigment ends up evenly distributed.

Preferred ending colors respectively symbolize skin tones for African-Americans, Asians, LatinX and Caucasians. This color material is then rolled to a sufficient thickness and then shaped via conventional means (molding and/or cutting) to make rectangles, preferably with rounded corners, for example 8"×10". Thickness may be, for example, ¼". Conventional silicone post-processing is used if necessary, to cure or off-gas the finished blank pieces.

With the pad created it is now possible to "print" the pad design. This is performed using any conventional metal laser engraving machine, particularly ones that include ultraviolet lasers. A suitable machine is the ZYL UV laser engraving machine, which has output power of 5 W, laser wavelength of 355 nm and a workplace standard working area of 70 mm×70 mm, adjustable to 110 mm×110 mm and 220 mm×220 mm. Such machines are computer-controlled, and interoperate with conventional design programs to laser-engrave line designs (conventionally on metallic surfaces). Note that this step is not intended as an ink deposit step, but rather a laser treatment in the shape of the images onto the silicone pad. A pad is placed in the workspace of the laser engraver, usually flat while the controlled laser points downward. The laser engraver is actuated via its connected computer, such that the engraver proceeds to pass the laser over the pad surface in repeated sweeps sufficient times to create each desired line. The connected computer holds the design page that was previously created in (for example) PROCREATE, and actuates the laser in accordance with the individual design(s) of that page.

As a result of the foregoing system and method, laser discoloration of the dye pigment occurs. It has been observed that when the dye pigment is relatively dark, the effect can be selected (via adjustment of laser intensity) so that imagery is lighter than the background color. When the dye pigment is relatively light, the effect can be selected (via adjustment of laser intensity) so that imagery is darker than the background color. Laser intensity selections can be made empirically, that is, by observing discoloration and adjusting higher or lower until the desired line darkness or lightness results. It is also possible that some discoloration results from laser-actuated changes in the chemical structure of silicone material itself, to a small extent. The result is a heretofore unavailable advance in tattoo arts practice pads- customizable imagery that may now be traced or brushed over with a live ink-delivering needle by a body arts student. The surface of the resulting pad is completely smooth, without bumps or barriers that would interfere with the learning experience.

FIG. 1 shows a resulting example silicone practice pad. Pad 10 includes region 20 that contains the dye pigment worked in during pad manufacture. Image 30 is a butterfly. Image 40 is a stylized ghost. Image 50 is a skull within a heart. In all three cases, the completed pad is now ready for practice by a student or apprentice, using real needles and ink. The material is silicone, not inferior latex. Since the pad is smooth, even in the design areas, no blocking areas (such as deposited vinyl of the prior art) will interfere with the needlework learning experience. It will be appreciated that a local shop or school using the system and method might advantageously change designs, keeping students challenged with different or more advanced exercises, which can be done rapidly and easily using the invention described herein.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

I claim:

1. A method for making a tattoo art silicone practice pad, comprising:
   a) distributing a color dye uniformly into material used to create a silicone pad during its manufacture so that the material has color based on distributed dye pigment,
   b) shaping the material into a tattoo art silicone practice pad comprising a surface, and
   c) lasering at least one line image onto the surface of the tattoo art silicone practice pad such that the surface of the tattoo art silicone practice pad remains smooth and without bumps or barriers without removal of pad material at the line image,
   whereby discoloration in the shape of the line image on the pigment results without covering silicone with another material and without altering smoothness or silicone-tattoo needle interactions.

2. The method of claim 1, comprising lasering multiple line images onto the tattoo art silicone practice pad.

3. The method of claim 1, further comprising selecting a laser intensity that lightens the pigment in the presence of laser energy.

4. The method of claim 1, further comprising selecting a laser intensity that darkens the pigment in the presence of laser energy.

5. The method of claim 1, further comprising selecting a proportion of color dye that corresponds to an ethnicity skin tone, from the group comprising African-American, Asian, LatinX and Caucasian shades.

* * * * *